Sept. 30, 1930.    G. REINICKE    1,776,842
DEVICE FOR DETERMINING THE PROGRESS OF WORK
Filed May 17, 1929
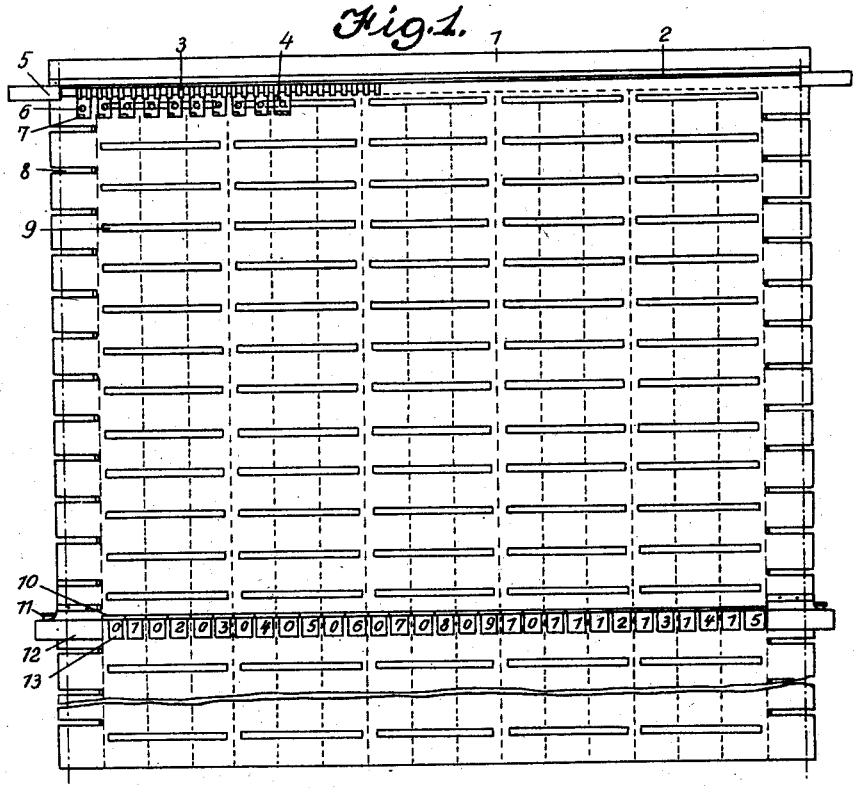
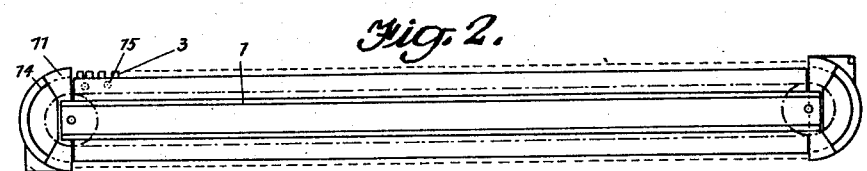
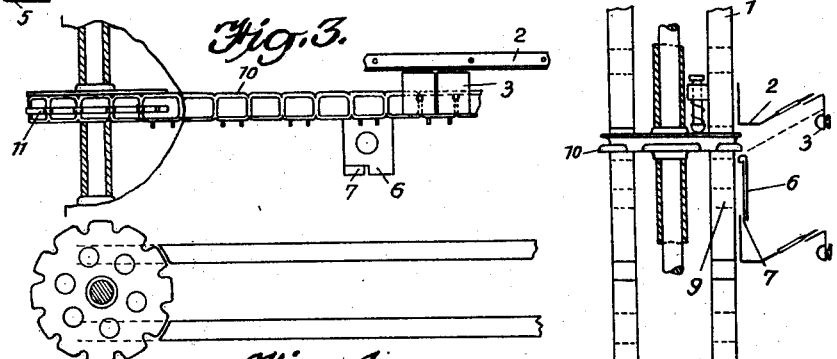
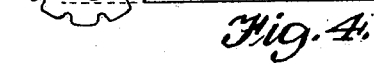
Inventor:
Georg Reinicke Patented Sept. 30, 1930

1,776,842

UNITED STATES PATENT OFFICE

GEORG REINICKE, OF HAGEN, GERMANY

DEVICE FOR DETERMINING THE PROGRESS OF WORK

Application filed May 17, 1929, Serial No. 363,870, and in Germany July 16, 1928.

The present invention relates to a device for determining the progress of work, and has for its object to provide means for determining the progress made in a positive and simple manner.

Modern scientific control of technical operations in factories employs a number of devices and forms for the purpose of regulating work and determining the time a given job will be finished, but it has been found impossible so far to arrange for the distribution of work and the determination of the time when a job will be finished in a positive and practical manner.

The present invention achieves this aim by causing the time band to move according to the clock each band representing a means of work, according to the progress made in the work, the drive taking place by hand or any other means of transmission.

The main feature of the invention is a chart provided with a number of parallel endless bands or chains carrying superimposed and hinged pairs of small plates of different color and same size. One of the chains serves for dividing time while the others represent one means of work, or a group, each. The division of time follows the clock time and is indicated by a forward movement to the extent of a unit of measurement adapted to the plant concerned. Each of the other chains is moved directly according to the progress of work made on the means of work concerned which it represents either by hand or electrically from the means of work in such a way that during the progress of the work the movement takes place in the same direction as that of the means representing time, for example from right to left. On the border of the chart where the small plates disappear according to the rate of speed at which the work is being finished, the plates are turned over automatically to occupy a position of rest and appear on the back of the chart in the latter position, ready to indicate other operations.

One embodiment of the invention is illustrated in the accompanying drawing, in which Figure 1 is a view of the chart and Figs. 2, 3, 4 and 5 are views of the chain mechanism.

The chart is shaped like a box (Fig. 1), the front and rear walls of which are alike and serve the same purpose, and provided in row-like arrangement with a number of slots 8 which can be illuminated by means of suitable electric devices kept in the box. Each horizontal slot line represents a means of work, the designation of which is attached to the left-hand border of the chart at 5. Over each row of slots moves a chain 10 (Figs. 1, 2) guided over rotatable shafts 11 and 14 (Figs. 1, 2, 3) at the edges of the chart so that the chain can be moved horizontally to the right and left. From the chain depends a continuous row of small transparent plates 6, 7 (Figs. 1, 3, 5) which are arranged in pairs so that one covers the other, the color of the upper plate being red and that of the lower one, green. They are swingingly arranged on the chain and can be turned over into a position of rest so as to cooperate in the horizontal motion of the chain without being visible to an onlooker. When turned down, they cover the illuminated slots and constitute a line formation.

One of these lines on the chart is the time dividing line and differs from the other lines representing means of work only in so far as the small plates are not suspended in pairs so that one covers the other, but depend singly and are non-transparent and provided with time figures for daily or monthly periods, as indicated by 13 in Fig. 1.

The time required for any operation by any means of work can be indicated by dropping a certain number of small plates, the time value of the latter being fixed by the division accepted for the time line. The kind of work carried on is indicated by placing a number plate over the last small plate on the right. The various colors adopted for the small plates assist in finding out whether an operation is merely in course of preparation or whether the job has already passed to the means of work. Successive operations carried on by means of the same means of work are represented one after another on the line.

The chains representing the various means of work are independent from one another and are moved from right to left according to the speed at which the operation is carried out so that the amount of working time indicated is moved also while the disappearance of the left-hand small plates shows the reduction of operations.

In the same manner and according to the speed of the clock the time dividing chain is moved either by clockwork or intermittently by hand so that one may read at any time (the hour and date being always at the extreme left) when an order may be started, when it will be finished and how long it will take to pass it through the various steps of the working process.

I claim:—

1. In a device of the type described a plurality of endless bands arranged thereon in pairs, and a plurality of superimposed pairs of small plates of equal size and different color hingedly attached to the said bands one of which serves for dividing time while the others represent one means of work each or a group thereof.

2. In a device of the type described a plurality of endless chains arranged thereon in pairs, and a plurality of superimposed pairs of small plates of equal size and different color hingedly attached to the said chains one of which serves for dividing time while the others represent one means of work each or a group thereof.

3. A device for determining the progress of work comprising a box-like chart with slotted front and rear walls, the slots being arranged in horizontal lines representing a means of work and adapted to be illuminated, a plurality of rotatable shafts, means adapted to be guided horizontally over the lines of slots and the said shafts in accordance with the progress of the work, a plurality of plates swingingly depending from the said means and adapted to cooperate in the motion thereof, and a movable line system representing the division of time and adapted to be displaced according to clock time, the means representing time and means of work being independent from one another.

4. The combination according to claim 3 and a plurality of small differently colored plates arranged in pairs to indicate the time required by, and the progress made in, a given operation.

In testimony whereof I have affixed my signature.

GEORG REINICKE.